June 28, 1960 S. K. TCHEJEYAN 2,943,030

METHOD OF MAKING RETICLES

Filed Oct. 25, 1957

INVENTOR.
SARKIS K. TCHEJEYAN

BY G. A. Ellestad
B. A. Chiama
ATTORNEYS

United States Patent Office 2,943,030

Patented June 28, 1960

2,943,030

METHOD OF MAKING RETICLES

Sarkis K. Tchejeyan, Rochester, N.Y., assignor to Bausch & Lomb Optical Company, Rochester, N.Y., a corporation of New York Filed Oct. 25, 1957, Ser. No. 692,468

2 Claims. (Cl. 204—15)

This invention relates to an apparatus and method for making reticles and more particularly for making reticles having tapered indicia areas for use in gun telescopic sights and the like.

In recent years, tapered reticles have been very popular on gun telescopic sights having a variable power lens system because the shape and size of the indicia of the reticle appear to be substantially the same in the field of view for all magnifications of the instrument. However, the manufacture of tapered reticles has been extremely difficult and as a result of this, the reticle itself has been rather expensive. Generally, these have been formed on an optical element or glass blank by an emulsion process with the result that the edges of the indicia of the reticle are rather rough and frayed. Other methods for making tapered reticles involve the use of a suitable metal which is deposited by a process such as the photometallic or evaporation process. Reticles produced in this manner are of high quality, however, the process for making the same requires elaborate machinery and careful expert handling to insure this quality, thus generally adding to the expense for making reticles. Therefore, it is the principal object of the present invention to produce a reticle having sharp and clear indicia areas thereby presenting a distinctive, sharp sighting mark through which a target may be viewed.

Another object of the invention is to provide means for manufacturing a reticle having tapered indicia parts which will be low in cost and will require little handling and maintenance.

Other objects and advantages will become apparent from the following description taken in conjunction with the drawing wherein.

The present invention is adapted to produce tapered indicia reticles by an electroplating process wherein different parts of the indicia or legs of the reticle, which are in the form of a pair of crossed wires of extremely small diameter, are exposed to the plating process for progressively longer periods of time while the reticle is being rotated on its center axis normal to the plane thereof. Preferably, the diameter of the wires is chosen to coincide with the minimum desired indicia width which will be at the center or point of intersection of the crossed wire reticle. By this process, the finished reticle will have tapered indicia, the taper beginning near or at the point of intersection and ending at the extreme outer end of each of the indicia. Rotation of the crossed wires will insure that the taper of each of the legs will be substantially equal to the other legs. The rate of taper may be controlled to any desired amount and this rate will be equal for each of the leg portions. In this manner, for use in a variable power telescopic gun sight, the indicia legs are formed as continuously tapered narrow areas which point toward the point of intersection.

Figure 1:
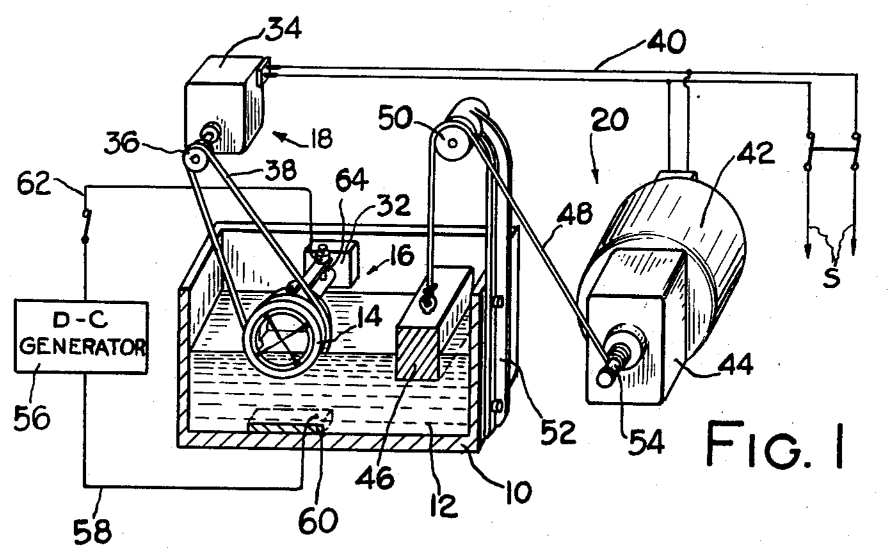
Fig. 1 is a diagram of apparatus for making the reticle in accordance with the invention.

Referring now to the drawing, the apparatus embodying the principles of the present invention is shown in Fig. 1 and comprises a plating tank 10, shown in cross-section, containing an electrolyte 12, a metallic reticle mounting sleeve 14, a mounting assembly 16 for supporting the sleeve 14 for rotation, a motor assembly indicated generally by the reference numeral 18 for imparting rotation to the sleeve 14 and a motor assembly indicated generally at 20 for controlling the level of the solution 12. For purposes of this invention, the crossed wires are plated with copper, thus the electrolyte 12 will comprise essentially a copper sulfate solution.

Figure 2:
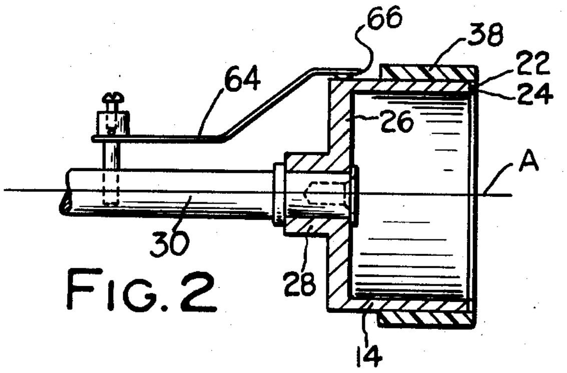
Fig. 2 is a cross-sectional view showing the reticle mounting sleeve in relation to the level of the electrolyte at the start of the process for making the same.
Figure 3:
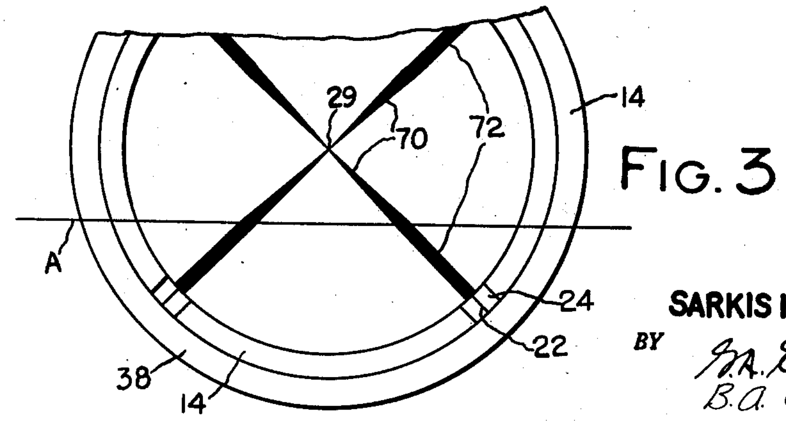

In Figs. 2 and 3, the reticle mounting sleeve 14 has an open end across which is placed a pair of crossed wires having four angularly disposed legs 22. The ends of each of the legs may be suitably attached to the sleeve 14 at the vertex of each of the corresponding grooves 24 formed in the periphery of the sleeve. The other end of the sleeve has an end wall 26 formed with a projecting nipple 28 which is arranged coaxial with the sleeve and the point of intersection 29 for crossed wires. The mounting assembly 16 includes an axle 30 rigidly supported by a block 32 which is fixed at the end of the tank 10. The other end of the axle is rotatably received within the nipple 28, the inner surface of which serves as a bearing surface during rotation of the nipple upon the axle. Any suitable means may be utilized to prevent axial displacement of the sleeve with respect to the axle 30.

The motor assembly 18 includes an electric motor 34 for rotating a pulley 36 and a belt 38 which passes around the sleeve 14 for imparting rotation thereto about an axis coincident with the point of intersection 29 for the crossed wires. An electric circuit 40 connected to the motor 34 serves to conduct sufficient electric current from a suitable electric source S to the motor for rotating the same. The motor 34 is preferably of the slow speed type or if this is not possible, a gear reduction box may be interposed between the motor 34 and the pulley 36 for insuring that a constant slow speed output is derived from this motor.

The motor assembly 20 is adapted to lower the level of the solution 12 at predetermined slow rate and comprises an electric motor 42 energized from the source S through the circuit 40, a gear reduction box 44 connected to the shaft of the motor 42, and a weight 46 immersible in the solution 12. A cable 48, attached to the weight 46, is looped around a pulley 50 which is positioned thereabove by means of an upstanding post 52 secured to the side of the tank. The other end of the cable 48 is secured to and wound around the output shaft 54 of the gear reduction box 44. Slow rotation of the shaft 54 will gradually raise the weight with respect to the level of the solution 12 thereby correspondingly lowering the level thereof.

To complete the apparatus, a direct current source 56 is utilized to furnish electric current to the cross-wire assembly for the plating operation. A conductor 58 from the source 56 is connected to a copper anode 60 positioned within the tank 10 and another conductor 62 is connected to a commutator brush 64 attached to the axle 30. The commutator brush is provided with a button 66 which is continuously in contact with the sleeve 14 thus completing the electrolysis circuit to the legs 22 of the crossed wires.

In operation, the level A of the solution 12 is initially set at or adjacent the point of intersection 29 of the crossed wires, see Fig. 2, either by adjusting the height of the sleeve 14 or by adjusting the positioning of the weight 46 with respect to the level of the solution. Rotation is then imparted to the sleeve 14 by the motor assembly 18 and simultaneously with this operation the weight 46 is slowly but gradually raised as by the motor assembly 20. The electric circuit to the crossed wires, which serves as the cathode for the plating process, is closed and the electroplating thereof commences.

Figure 4:
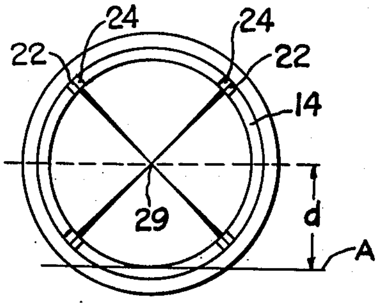
Figs. 3 and 4 are elevational views of the reticle mounting sleeve showing two stages of development of the reticle.

As the level of the solution lowers, plating of the crossed wires immediately above the level ceases while that below the level continues. In this manner, a tapered film of plating material, in this case copper, will develop upon each of the legs of the metallic crossed wires. As shown in Fig. 3, the portions 70 of the legs, which are now above the level A, are tapered as these portions are finished in the plating cycle. However, it is noted, the portions 72, which are still below the level, are as yet not tapered, in fact, they are substantially cylindrical since these portions continue to be exposed uniformly to the plating solution. In Fig. 4, the level A, having been lowered a distance *d*, the length of one of the legs, has reached the outer extremes of the legs and therefore plating will terminate with tapering of the legs complete.

The finished reticle or crossed wires having tapered legs or indicia is adapted for use as a reticle in a variable power telescopic gun sight. The amount of taper for each of the legs is controlled by the velocity with which the level A is lowered and, rotation of the crossed wires insures that all of the legs of the crossed wires are equally exposed to the plating cycle.

While a pair of crossed wires has been disclosed in the preceding description, it will be understood that any number of wires may be utilized for the practice of the present invention. For example, a single wire may be extended across the open end of the sleeve 14 along a diameter thereof and the same may be rotated at a point, preferably the mid-point, where tapering is to commence. In this arrangement, only two tapering indicia will be produced and these will be pointing at each other along the same line. Similarly, the single wire may be combined with a wire extending between the mid-point of the single wire and the sleeve so as to effect a three indicia reticle. In each of these arrangements, tapering will be effected by the same process as described for the pair of crossed wires shown in Figs. 2–4.

The aforementioned process may be modified somewhat by raising the level of the solution instead of lowering the same and in this case, the weight 46 is gradually lowered at a predetermined slow rate so that the level may rise the distance *d* from an initial position near the ends of the crossed wires to a final position at the intersection thereof.

The present invention by combining rotation and level control in the plating of crossed wires is adapted for the production of a reticle having tapered indicia which, because extremely small metallic particles are involved, will provide a distinctive, sharp sighting mark through which a target may be viewed. In addition, the apparatus is relatively simple and comprises relatively inexpensive, easily obtained components thereby serving as a reticle manufacturing means which will be low in cost and require little maintenance.

While there is in this application specifically described one form which the invention may assume in practice, it will be understood that this form is shown for purposes of illustration, and that the same may be modified and embodied in various other forms or employed in other uses without departing from the spirit or the scope of the appended claims.

I claim:

1. The method of making tapered indicia for use in a reticle comprising the steps of supporting at least one wire at its ends, positioning the wire in a plane which traverses the surface of an electrolyte and depositing metal on the immersed wire by electrolytic action while continually rotating the wire in said plane about an axis coincident with approximately the mid-point of said wire and gradually varying the depth of immersion of the wire in the electrolyte whereby metal will be deposited along the wires in varying amounts to provide tapered indicia for a reticle.

2. The method of making tapered indicia for use in a reticle comprising the steps of supporting a plurality of crossed wires at their respective ends, positioning the assembled wires in an electrolyte with the plane of the wires intersecting the surface of the electrolyte and depositing metal on the immersed wires by electrolytic action while continually rotating the wires in said plane about an axis coincident with the point of intersection of said crossed wires and gradually varying the depth of immersion of the wires in the electrolyte whereby metal will be deposited along the wires in varying amounts to provide tapered indicia for a reticle.

References Cited in the file of this patent

UNITED STATES PATENTS

| | | |
|---|---|---|
| 1,335,176 | Merritt | Mar. 30, 1920 |
| 1,555,840 | Hanley | Oct. 6, 1925 |
| 2,138,938 | Plensler | Dec. 6, 1938 |
| 2,344,859 | Fox | Mar. 21, 1944 |
| 2,438,885 | Bell | Apr. 6, 1948 |
| 2,722,623 | Law | Nov. 1, 1955 |